United States Patent [19]

Chou

[11] Patent Number: 4,638,669

[45] Date of Patent: Jan. 27, 1987

[54] QUANTUM TUNNELING CANTILEVER ACCELEROMETER

[75] Inventor: Stephen Y. Chou, Stanford, Calif.

[73] Assignee: Massachusetts Institute of Technology, Cambridge, Mass.

[21] Appl. No.: 731,715

[22] Filed: May 7, 1985

[51] Int. Cl.$^4$ ............................................. G01P 15/08
[52] U.S. Cl. .................................. 73/517 R; 73/862.64
[58] Field of Search ............ 73/517 R, 862.64, 862.68

[56] References Cited

U.S. PATENT DOCUMENTS

| | | | |
|---|---|---|---|
| 2,155,420 | 4/1939 | Gunn | 73/517 R |
| 2,837,675 | 6/1958 | Iversen | 73/517 R |
| 2,839,701 | 6/1958 | Bourns | 73/517 R |
| 3,491,588 | 1/1970 | Yerman | 73/141 |
| 3,727,209 | 4/1973 | White et al. | 340/262 |
| 3,764,820 | 10/1973 | White et al. | 307/121 |

OTHER PUBLICATIONS

"Tunneling Through a Controllable Vacuum Gap", G. Binnig et al., *Appl. Phys. Lett.*, vol. 40, No. 2, Jan. 15, 1982, pp. 178-180.

"Fowler-Nordheim Tunneling Into Thermally Grown SiO$_2$", M. Lenzlinger et al., *Journal of Applied Physics*, vol. 40, No. 1, Jan. 1969, pp. 278-283.

*Primary Examiner*—Stewart J. Levy
*Assistant Examiner*—John E. Chapman, Jr.
*Attorney, Agent, or Firm*—Robert F. O'Connell; Robert M. Asher

[57] ABSTRACT

A highly sensitive accelerometer is disclosed in which the current is measured across a pair of electrodes resulting from voltage pulses from a pulse generator. The electrodes are located within a vacuum chamber. One of the electrodes is cantilevered and has its free end suspended over the other fixed electrode. The amount of current through the vacuum gap between the electrodes is determinative of acceleration since the current is an exponential function of the distance between the electrodes and the distance between the electrodes changes linearly with acceleration.

10 Claims, 5 Drawing Figures

QUANTUM TUNNELING CANTILEVER ACCELEROMETER

BACKGROUND OF THE INVENTION

This invention relates to an apparatus and method for making highly sensitive measurements of acceleration.

In missiles, satellites or spaceships travelling at very high speeds, the accurate measurement of acceleration can be very important to give guidance and navigation. A slight change in acceleration has a major effect on the distance travelled by such a projectile. In order to maintain a reliable guidance system, a highly accurate accelerometer is desirable.

A threshold accelerator switch has been disclosed by White et al. in U.S. Pat. Nos. 3,727,209 and 3,764,820. Each switch can only determine when a certain threshold level of acceleration has been reached. To get an acceleration profile, a plurality of switches having different acceleration thresholds are required. Furthermore, the acceleration switches disclosed by White et al. have a sensitivity of about 25 g, where g=9.8 m/sec.$^2$, the acceleration due to gravity. It is an object of the present invention to overcome the disadvantages of the prior art and provide a more versatile and sensitive accelerometer.

SUMMARY OF THE INVENTION

This invention is directed to an accelerometer which includes a fixed electrode and a cantilevered electrode with a free end spaced away from and situated over the fixed electrode. The electrodes are located with a vacuum. A pulse generator provides a voltage pulse across the vacuum gap between the electrodes to cause a tunneling current which is measured by a pulse ammeter. The amount of current which will be measured is exponentially dependent upon the distance between the free end of the cantilevered electrode and the fixed electrode. Since acceleration of the accelerometer in a direction perpendicular to the alignment of the two electrodes will cause the cantilevered electrode to move with respect to the fixed electrode, acceleration can be determined from the measurement of the current.

The present invention is based on a fundamentally different concept from the prior art. The present invention takes advantage of quantum tunneling to provide acceleration sensitivity which can be on the order of $10^{-7}$ g. By repeatedly measuring the tunneling current caused by a succession of voltage pulses essentially continuous measurement of acceleration is made possible.

Other objects and advantages of the invention will become apparent during the following description of the presently preferred embodiment of the invention taken in conjunction with the drawings.

DETAILED DESCRIPTION OF THE PREFERRED EMBODIMENTS

Figure 1:
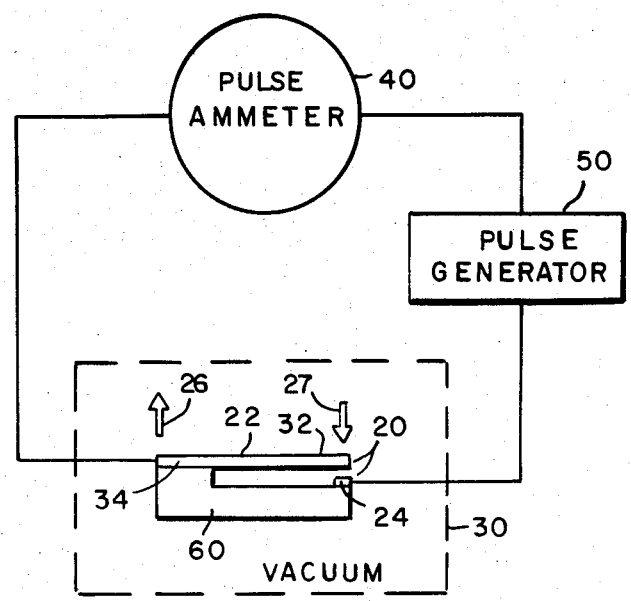
FIG. 1 is a schematic diagram of the accelerometer of the present invention.

Turning now to the drawings, FIG. 1 is a simplified schematic representation of an accelerometer 10 of the present invention. The accelerometer 10 includes a pair of electrodes 20 encased within a vacuum 30. The pressure within the vacuum 30 is preferably at least as low as $10^{-5}$ torr. The electrodes 20 include a cantilevered electrode 22 and a fixed electrode 24. According to the laws of physics, if the pair of electrodes 20 is accelerated in a direction, shown by arrow 26, the cantilevered electrode 22 will be deflected towards the fixed electrode 24, the direction shown by arrow 27. The cantilevered electrode 22 includes a free end 32 and a fixed end 34. Upon acceleration of the device, the free end 32 deflects towards the fixed electrode 24. The distance of the displacement of the free end 32 is directly proportional to the acceleration. Acceleration a is related to the displacement $\delta$ of the free end 32 of the cantilevered electrode 22, by the following formula:

$$a = 2Et^2\delta/3pL^4$$

where E is the Young's modulus of the cantilevered electrode 22, p is the mass density of the cantilevered electrode 22, t is the thickness of the electrode 22, and L is the length of the unfixed portion of the electrode 22. Thus, acceleration can be determined from a measure of the displacement of the free end of the cantilevered electrode 22.

The displacement can be determined by measuring the tunneling current which travels across the electrodes 20. The tunneling current density J depends on the distance d between the electrodes exponentially.

$$J = \frac{d^3V^2}{8\pi h\phi d^2} \exp\left[\frac{-8\pi\sqrt{2m}\ \phi^{3/2}\ d}{3\ hd\ V}\right] \frac{\text{amperes}}{\text{meter}^2}$$

In this equation $\phi$ is the barrier height, d is the distance between the electrodes, V is the voltage applied on the electrodes, q is the charge of an electron, m is the mass of an electron, and h is Planck's constant. The voltage pulse should be about 20 volts for a gap distance of 0.2 microns. The relationship between tunneling current and distance d is dominated by the d in the exponent rather than the d$^2$ in the denominator in the total range of operation. Thus, there is an approximately linear relationship between the log of the current and the distance d.

The tunneling current is measured by a pulse ammeter 40. Any pulse ammeter, known in the art, capable of measuring the level of amperage generated by the acceleration for which the accelerometer is being used may be employed in the circuit. A voltage source is necessary to impress a current in the circuit of the accelerometer 10. According to the present invention, a pulse generator 50 provides voltage pulses which cause the current which is measured in the ammeter 40. By using a pulse generator rather than a constant voltage source, the present invention advantageously avoids the excessive build-up of electrostatic force between the pair of electrodes 20 which would affect the displacement so that it would no longer be a reliable measure of acceleration.

Figure 2:
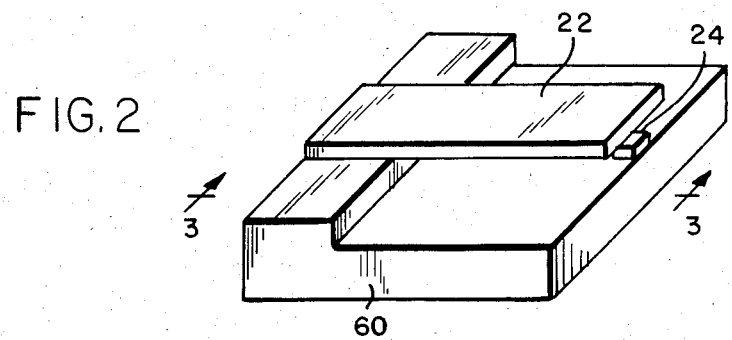
FIG. 2 is a perspective view of the electrodes of the present invention.
Figure 3:
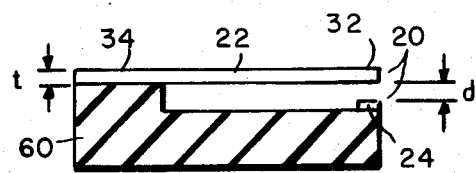
FIG. 3 is a cross-sectional view of the electrodes of FIG. 2 taken along lines 3—3.
Figure 4:
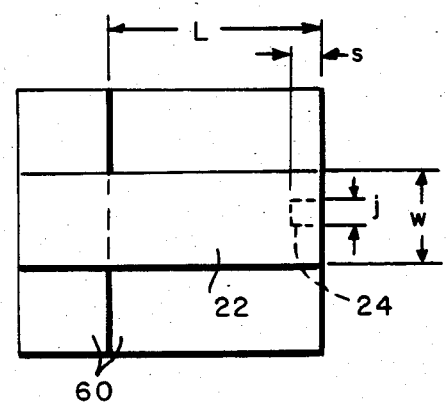
FIG. 4 is a plan view of the electrodes of FIG. 2.

Referring now to FIGS. 2-4, the electrodes 20 are described in greater detail. The electrodes 20 are fixed upon an electrically insulating slab 60. Typical materials for the insulation are silicon dioxide or silicon nitride.

The cantilevered electrode 22 is fixed at one end 34 to the insulator 60. The other end 32 is suspended over the small fixed electrode 24. The unfixed portion of the cantilevered electrode 22 has a length L which in the presently described embodiment is 2 mm. The width w of the cantilevered electrode 22 is 2 mm and its thickness h is 2000 Angstroms. The distance of the gap between the free end 32 of the cantilevered electrode 22 and the fixed electrode 24 is 0.2 microns in the unaccelerated state of the present embodiment. The size of the fixed electrode aligned beneath the cantilevered electrode 24 in the presently described embodiment had a width j of ten microns and a length s of 50 microns. The fixed electrode 24 may extend beyond the area directly beneath the cantilevered electrode. However, only the area of the electrode aligned beneath the cantilevered electrode affects the amount of tunneling current. The size of the fixed electrode 24 aligned with the cantilevered electrode may be varied in accordance with the sensitivity of the pulse ammeter being used. A less sensitive ammeter may require a fixed electrode 24 with a greater area to increase the amount of current.

Tunneling current is extremely sensitive to changes in the distance of the gap between the two electrodes. Thus, a pulse ammeter may be used to resolve displacement of the free end 32 of the cantilevered electrode 22 by an amount as small as two Angstroms. The cantilevered electrode 22 may be made of any conductive metal having a suitable Young's modulus, such as tungsten or gold. Gold is the presently preferred material. The material for the fixed electrode 24 is less critical since it is stationary. Any conductive metal, including copper, gold or tungsten, may be selected.

Referring to the equation given earlier for acceleration, the detectable level of acceleration for the presently described embodiment can be calculated. For the case where the cantilevered electrode 22 is made of tungsten, the Young's modulus of tungsten is $3.6 \times 10^{11}$ NM$^{-2}$ and its mass density is $19.3 \times 10^3$ kg/m$^3$. Since the resolvable deflection of the cantilevered electrode is 2 Angstroms, the detectable acceleration for the presently described embodiment is $6.2 \times 10^{-6}$ m/sec.$^2$ which equals $6.3 \times 10^{-7}$ g, where g is the gravitational acceleration.

There are a number of extraneous factors which affect the relationship of the tunneling current to displacement. However, these factors are minimized by the present invention so that they do not affect the reliability of the measurements. Barrier lowering is one factor that is encountered. The image charge induced in the electrodes causes barrier lowering determined by the following equation:

$$\Delta \phi = \left[ \frac{dE}{4\pi\epsilon_0} \right]^{\frac{1}{2}}$$

In this equation, E is the electric field between the electrodes and $\epsilon_o$ is the dielectric constant of the area between the electrodes. Thus, the effect of barrier lowering due to image charge can be accounted for in calculating the acceleration indicated by a certain amount of current. Barrier height can also be affected by contamintion of the electrodes. This effect may be factored out by calibrating the accelerometer or taking measurements to determine the actual barrier height.

Thermionic current must be kept small so that it does not substantially alter the tunneling current measurement to create an unreasonably large error in the measurements. The thermionic current density is given by $$J_{th} = AT^2 \exp\left[ -\frac{\phi}{RT} \right]$$

where $$A = \frac{4\pi \, gm^* R^2}{h^3}$$

R is the Boltzmann constant, h is Planck's constant, T is the temperature, and m* is the effective mass of an electron. For an effective barrier height of 0.7 eV, which is a rough approximation for the presently described embodiment, the thermionic current density is $7.3 \times 10^{-6}$ amps/cm$^2$, whereas the tunneling current for the electric field would be on the order of $6 \times 10^{-3}$ amps/cm$^2$. In this case, the thermionic current is much smaller than the tunneling current and the measurements are negligibly affected. Should the thermionic current grow to be a problem, it would be necessary to maintain the electrodes 20 at a low temperature to supress the thermionic current.

As stated earlier, electrostatic force is another interfering problem which must be contended with. If a constant voltage source is provided to the electrodes, the electrostatic force may build up to be so strong that the force causes the cantilevered electrode to touch the fixed electrode. In order to reduce the electrostatic force the area of the fixed electrode 24 is kept very small. However, even for the dimensions given in the present embodiment, the electrostatic force may grow to be too large. The problem is avoided by providing a single pulse voltage to the electrodes 20, the duration of the pulse must be shorter than the mechanical response time of the cantilever. Thus, the distance between the two electrodes can be measured without electrostatic force having an affect on the position of the cantilever. The voltage pulse may be provided at regular intervals for a substantially continuous acceleration reading. The voltage pulse can be generated for a duration of well below a microsecond, thus, any distortion of measurement due to mechanical response to an electrostatic force can be avoided.

It is, thus, shown that a cantilevered electrode configuration can be used to provide an ultrasensitive measurement of acceleration.

Figure 5:
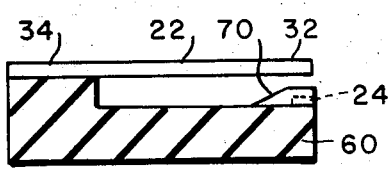
FIG. 5 is a cross-sectional view of the electrodes in a second embodiment of the invention.

Referring now to FIG. 5, an alternate embodiment of the invention is shown. An insulating layer 70 is provided over the fixed electrode 24. The insulating layer 70 prevents the cantilevered electrode 22 from ever touching the fixed electrode 24. If the electrodes do touch one another, the huge current which would flow through them would likely permanently damage the accelerometer. The insulating layer prevents damage due to touching but does not interfere with the tunneling current. For a 0.2 micron gap between the electrodes, an insulating layer 70 of 0.1 micron could be used. Polyimide and silicon nitride are materials which can be used for the insulating layer 70 in the presently preferred embodiment.

Of course, it should be understood that various changes and modifications to the preferred embodiment described above will be apparent to those skilled in the art. For example, an equivalent pair of electrodes may be used in a different geometrical configuration or the distances and materials used could be changed. These and other changes can be made without departing from the spirit and the scope of the invention and without diminishing its attendant advantages. It is therefore intended that such changes and modifications be covered by the following claims.

I claim:

1. An accelerometer comprising;
   a vacuum chamber;
   an electrode fixed in position within said vacuum chamber;
   a cantilevered electrode located within said vacuum chamber having a fixed end and a free end, the free end of said cantilevered electrode being aligned with and separated from said fixed electrode such that acceleration of said accelerometer causes the free end of said cantilevered electrode to move towards said fixed electrode;
   means for providing a voltage pulse across said fixed electrode and said cantilevered electrode; and
   means for measuring the current flow caused by said voltage pulse, the amount of acceleration being determinable from the current measurement.

2. The accelerometer of claim 1 wherein the current flow caused by said voltage pulse is substantially composed of tunneling current.

3. The accelerometer of claim 1 wherein said current measuring means comprises a pulse ammeter.

4. The accelerometer of claim 1 further comprising an insulation layer covering said fixed electrode so that said cantilevered electrode is prevented from touching said fixed electrode.

5. A highly sensitive accelerometer comprising;
   a vacuum chamber;
   an electrical insulation member located within said vacuum chamber;
   an electrode fixed on said insulation member;
   a cantilevered electrode having one end fixed on said insulation member and a free end suspended over said fixed electrode;
   a pulse generator which provides a voltage pulse across said fixed electrode and said cantilevered electrode; and
   means for measuring the current across the vacuum gap between said fixed electrode and said cantilevered electrode.

6. The accelerometer of claim 5 wherein the current flow caused by said voltage pulse is substantially composed of tunneling current.

7. The accelerometer of claim 5 wherein said current measuring means comprises a pulse ammeter.

8. The accelerometer of claim 5 further comprising an insulation layer covering said fixed electrode so that said cantilevered electrode is prevented from touching said fixed electrode.

9. A method for making highly sensitlive acceleration measurements comprising;
   providing a vacuum chamber;
   generating a voltage pulse across a pair of electrodes located within the vacuum chamber, one electrode in cantilever suspension over the other electrode such that the distance between said electrodes provides a measure of acceleration; and
   measuring the current flow caused by said voltage pulse, said current measurement providing a measure of the distance between the electrodes and hence the acceleration.

10. The method of claim 9 wherein the current flow caused by said voltage pulse is substantially composed of tunneling current.

* * * * *